United States Patent Office 3,654,216
Patented Apr. 4, 1972

3,654,216
HIGH STRENGTH FLUOROCARBON ELASTOMER COMPOSITIONS
Kermon Murray, Enon, Ohio, assignor to the United States of America as repesented by the Secretary of the Air Force
No Drawing. Filed Feb. 25, 1970, Ser. No. 14,188
Int. Cl. C08f *15/08*
U.S. Cl. 260—41 B                   6 Claims

ABSTRACT OF THE DISCLOSURE

A high strength fluorocarbon elastomer composition is prepared by curing a mixture comprising (1) a copolymer of hexafluoropropylene and vinylidene fluoride, (2) magnesium oxide, (3) N-(4-carboxyphenyl)maleimide, and (4) benzoyl peroxide. The vulcanizates are useful in the fabrication of seals, O-rings, hose, tires, vibration damping devices, and the like.

---

This invention relates to fluorocarbon elastomer compositions. In one aspect it relates to vulcanizates which have outstanding high temperature properties.

There is a need for elastomeric materials that maintain a balance of useful physical and mechanical properties. This need is particularly great for aerospace systems which impose increasing temperature requirements, e.g., up to 600° F., for such components as seals, hose, and vibration damping devices.

Although fluorocarbon compounds are satisfactory for a wide variety of applications, they still possess certain undesirable characteristics. For example, the best commercial fluorocarbon materials have excellent thermal stability up to 400° F., but they will perform as static or dynamic seals at this temperature for only a limited period of time. To extend this time, it is necessary to restrict the operating conditions to a lower temperature. Also, while the prior art elastomers possess good physical properties, such as tensile strength, elongation and hardness, at room temperature, these properties have been found to be unsatisfactory at elevated temperatures.

In the vulcanization of fluorocarbon compounds, it is conventional to employ an amine as the curing agent. The curing is usually conducted at 300° to 330° F., but vulcanization is not completed until the press-molded part is subjected to a post-curing operation which generally involves heating in a circulating air oven for a period of 16 to 24 hours at a temperature of 400° F. This is, of course, a time-consuming procedure which in addition to being an added expense introduces another variable which may have an effect on the reproducibility of product production. The literature discloses various systems for curing elastomers, such as organic peroxides, but they have not of themselves proven to be satisfactory for use with fluorocarbon compounds.

It is an object of this invention, therefore, to provide a novel combination of materials for curing fluorocarbon compounds.

Another object of this invention is to provide fluorocarbon vulcanizates which have outstanding properties at elevated temperatures.

A further object of the invention is to provide a process for preparing fluorocarbon elastomers having high stress-strain properties both before and after exposure to elevated temperatures.

Other and further objects and advantages of the invention will become apparent to those skilled in the art upon consideration of the accompanying disclosure.

Broadly speaking, the present invention resides in a composition comprising an elastomeric copolymer of hexafluoropropylene and vinylidene fluoride, (2) a basic metal oxide, (3) N-(4-carboxyphenyl)maleimide, and (4) an organic peroxide. In accordance with the process of this invention, the basic metal oxide, N-(4-carboxyphenyl) maleimide, and organic peroxide are incorporated into the aforementioned elastomeric copolymer and the compounded copolymer is then heated to a temperature in the range of about 270 to 280° F. for a period of time sufficient to cure the copolymer.

The essence of the present invention lies in the use of the combination of the basic metal oxide, N-(4-carboxyphenyl)maleimide and an organic peroxide in processing the hexafluoropropylenevinylidene fluoride copolymer. It has been found that the presence of these three materials is necessary in order to obtain a vulcanizate having the desired high temperature properties. Thus, the use of other maleimides or the use of only two of the materials, e.g., a basic metal oxide and an organic peroxide, fails to produce the superior product of this invention.

The elastomeric copolymer used in the practice of this invention is a commercially available item of commerce. The copolymer of hexafluoropropylene and vinylidene fluoride generally contains 30 to 70 weight percent vinylidene fluoride and 70 to 30 weight percent hexafluoropropylene. These copolymers are described in various publications, including Industrial and Engineering Chemistry, vol. 49, page 1687 (1957). The molecular weight of the copolymer can vary over a wide range, e.g., from 10,000 to 200,000, but the elastomeric polymers generally have a molecular weight greater than about 60,000.

Examples of suitable basic metal oxides that can be employed include magnesium oxide, zinc oxide and lead oxide. The preferred metal oxide is magnesium oxide. It is preferred to use the oxides in a finely divided form, and for best results they should be in a dry state. The amount of metal oxide used in the formulation generally falls in the range of about 15 to 30 parts by weight per 100 parts by weight of the copolymer. The results obtained when using about 25 parts by weight of the magnesium oxide are particularly outstanding.

The amount of N-(4-carboxyphenyl)maleimide that is used usually ranges from about 3 to 6 parts by weight per 100 parts by weight of the copolymer. The preferred amount is 4 to 5 parts by weight.

Examples of suitable organic peroxide curing agents include benzoyl peroxide, dicumyl peroxide, di-tert-butyl peroxide, cumene hydroperoxide, and the like. It is generally preferred to utilize benzoyl peroxide. The amount of organic peroxide used in the formulation generally ranges from about 4 to 6, preferably from 4.5 to 5, parts by weight of the copolymer.

Other materials that are conventionally used in processing elastomers may be included in the composition of this invention. These materials include fillers, such as carbon black, pyrolyzed fibers and magnesium silicate, as well as pigments and dyes.

In preparing the product of this invention, the components of the formulation are mixed by standard milling procedures. A conventional rubber roll mill can be conveniently employed for the mixing step. The copolymer is first placed on the roll mill after which the other three components are added in any desired order. During the mixing cold water is circulated through the rolls, particularly during and after peroxide addition to prevent its premature decomposition. Mixing is continued for a time sufficient to thoroughly disperse the ingredients in the copolymer. The mixture is then removed from the roll mill and press cured in suitable molding equipment at an appropriate pressure, e.g., a pressure ranging from 300 to 2,500 pounds per square inch. It has been found that vulcanizates with optimum properties are obtained when the cure step is carried out at a temperature of 270 to 280° F. for a period of 45 to 60 minutes.

A more comprehensive understanding of the invention can be obtained by referring to the following illustrative examples which are not intended, however, to be unduly limitative of the invention.

EXAMPLE I

A copolymer containing about 30 weight percent hexafluoropropylene and about 70 weight percent vinylidene fluoride and having a molecular weight of about 200,000 was used in preparing three compounded stocks. The compounding was carried out on a rubber roll mill while circulating tap water through the rolls: The following are the recipes used in the compounding:

|  | Parts by weight | | |
|---|---|---|---|
|  | 1 | 2 | 3 |
| Copolymer | 100 | 100 | 100 |
| Magnesium oxide [1] | 15 | 25 | 15 |
| N-(4-carboxyphenyl)maleimide | 4 | 4 | |
| Benzoyl peroxide | 4.5 | 4.5 | |
| Hexamethylene diamine carbamate | | | 2 |

[1] In a dry state and in the form of a powder having a fineness such that 99.5% passes through a 325 mesh screen.

After the compounding was completed, stocks number 1 and 2 were press cured at 280° F. for 60 minutes. Compounded stock number 3 containing an amine curing agent was initially press cured at 310° F. for 20 minutes after which it was oven cured at 400° F. for 24 hours. Certain tests were thereafter conducted to determine physical properties of the resulting vulcanizates, and the results of these tests are shown below in Table I. The dashes in the table indicate that the particular test was not conducted.

TABLE I

|  | 1 | 2 | 3 |
|---|---|---|---|
| Original, tested at room temp., R.T.: | | | |
| Tensile strength, p.s.i. [1] | 4,330 | 4,300 | 2,145 |
| Elongation, percent [1] | 560 | 440 | 110 |
| Hardness, Shore A [2] | 63 | 72 | 60 |
| Orginal, tested at 400° F.: | | | |
| Tensile strength, p.s.i. | 695 | 865 | 430 |
| Elongation, percent | 265 | 180 | 45 |
| Aged 16 hrs. at 400° F., tested at R.T.: | | | |
| Tensile strength, p.s.i. | 4,335 | | |
| Elongation, percent | 400 | | |
| Hardness, Shore A | 68 | | |
| Aged 16 hrs. at 400° F. tested at 400° F.: | | | |
| Tensile strength, p.s.i. | 735 | | |
| Elongation, percent | 170 | | |
| Aged 24 hrs. at 400° F., tested at R.T.: | | | |
| Tensile strength, p.s.i. | | 4,875 | |
| Elongation, percent | | 390 | |
| Hardness, Shore A | | 76 | |
| Aged 24 hrs. at 400° F., tested at 400° F.: | | | |
| Tensile strength, p.s.i. | | 940 | |
| Elongation, percent | | 160 | |
| Tear resistance, lbs./in. [3] | 273 | 315 | 111 |
| Low temperature retraction, ° F., [4] T R–10: | | | |
| Original | | −19 | −12 |
| Aged 16 hrs. at 400° F | | −14.5 | |

[1] Determined according to method of ASTM D412-66.
[2] Determined according to method of ASTM D2240-64T.
[3] Determined according to method of ASTM D624-54(Die A).
[4] Determined according to method of ASTM D1329-60.

The data in the foregoing table demonstrate that vulcanizates 1 and 2 of this invention possess excellent physical properties after only a press cure. Of particular significance are the high tensile strength and elongation properties of the vulcanizates at a high temperature. Physical properties of the amine-cured vulcanizate, which required a post cure in addition to a press cure, were greatly inferior to corresponding properties of vulcanizates 1 and 2.

EXAMPLE II

A compounded stock was prepared in which the recipe used was the same as recipes 1 and 2 of Example I except that the magnesium oxide was omitted. The stock sponged during curing, indicating an unsatisfactory vulcanizate.

EXAMPLE III

A compounded stock was prepared in which the recipe used was the same as recipe 1 of Example I except that the benzoyl peroxide was omitted. The compounded stock did not cure.

EXAMPLE IV

A compounded stock was prepared in which the recipe used was the same as recipe 2 of Example I except that N-phenylmaleimide was substituted for the N-(4-carboxyphenyl)maleimide. The compounded stock was press cured at 280° F. for 60 minutes. While the physical properties of the resulting vulcanizate at room temperature were comparable to the room temperature properties of the vulcanizate of recipe 2, the high temperature properties were inferior. For example, the tensile strength of the vulcanizate at 400° F. after aging for 24 hours at 400° F. was 590 p.s.i. as compared to 940 p.s.i. for the vulcanizate of recipe 1.

EXAMPLE V

A compounded stock was prepared in which the recipe used was the same as recipe 1 of Example I except that N(4-hydroxyphenyl)maleimide was substituted for the N(4-carboxyphenyl)maleimide and 4 parts of benzoyl peroxide rather than 4.5 parts was used. The compounded stock was press-cured at 300° F. for 60 minutes. The physical properties of the resulting vulcanizate were generally inferior to corresponding properties of the recipe 1 vulcanizate. However, the difference was particularly significant insofar as the high temperature properties were concerned. For example, the tensile strength of the vulcanizate at 400° F. after aging for 16 hours at 400° F. was 345 p.s.i. as compared to 735 p.s.i. for the vulcanizate of recipe 1.

As will be evident to those skilled in the art, various modifications of this invention, can be made or followed in the light of the foregoing disclosure without departing from the spirit or scope of the invention.

I claim:

1. A vulcanizable composition consisting essentially of an elastomeric copolymer of hexafluoropropylene and vinylidene fluoride, about 15 to 30 parts by weight of a basic metal oxide selected from the group consisting of magnesium oxide, zinc oxide and lead oxide, about 3 to 6 parts by weight of N-(4-carboxyphenyl)maleimide, and about 4 to 6 parts by weight of an organic peroxide, each amount being based on 100 parts by weight of said copolymer.

2. The composition according to claim 1 in which said basic metal oxide is magnesium oxide and said organic peroxide is benzoyl peroxide.

3. The composition according to claim 1 in which said basic metal oxide is zinc oxide.

4. The compsition according to claim 1 in which said organic peroxide is dicumyl peroxide.

5. A process for curing an elastomeric copolymer containg about 30 to 70 weight percent vinylidene fluoride and 70 to 30 weight percent hexafluoropropylene which comprises blending 100 parts by weight of said copolymer with about 15 to 30 parts by weight of a basic metal oxide selected from the group consisting of magnesium oxide, zinc oxide and lead oxide, about 3 to 6 parts by weight of N-(4-carboxyphenyl)maleimide and about 4 to 6 parts by weight of an organic peroxide; and heating the resulting blend at a temperature in the range of about 270 to 280° F. for a period of time sufficient to cure said copolymer.

6. The process according to claim 5 in which said basic metal oxide is magnesium oxide, said organic peroxide is benzoyl peroxide, and said blend is heated for a period of about 45 to 60 minutes.

(References on following page)

References Cited

UNITED STATES PATENTS

| | | | |
|---|---|---|---|
| 3,113,934 | 12/1963 | Grossman | 260—45.5 |
| 3,178,399 | 4/1965 | Lo | 260—87.7 |
| 2,925,407 | 2/1960 | Goldberg | 260—83.3 |
| 3,502,542 | 4/1970 | Wenisch | 161—216 |

FOREIGN PATENTS

| | | | |
|---|---|---|---|
| 665,064 | 6/1963 | Canada | 260—87.7 |
| 891,546 | 4/1962 | Great Britain | 260—87.7 |
| 679,690 | 2/1964 | Canada | 260—87.7 |

OTHER REFERENCES

Vulcanization with Maleimide, Tawney et al., Journal of Polymer Science, vol. 8, pp. 2281–2298, 1964.

MORRIS LIEBMAN, Primary Examiner

R. ZAITLEN, Assistant Examiner

U.S. Cl. X.R.

260—87.7